United States Patent
Nalluri et al.

(10) Patent No.: US 10,965,640 B2
(45) Date of Patent: Mar. 30, 2021

(54) CONFIGURATION OF AN M2M DEVICE

(71) Applicant: Telefonaktiebolaget LM Ericsson (publ), Stockholm (SE)

(72) Inventors: Srinivasa Rao Nalluri, Bangalore (IN); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/604,514

(22) PCT Filed: Apr. 13, 2017

(86) PCT No.: PCT/EP2017/059008
§ 371 (c)(1),
(2) Date: Oct. 10, 2019

(87) PCT Pub. No.: WO2018/188759
PCT Pub. Date: Oct. 18, 2018

(65) Prior Publication Data
US 2020/0153789 A1 May 14, 2020

(51) Int. Cl.
*H04L 29/12* (2006.01)
*H04W 4/70* (2018.01)
*H04W 76/11* (2018.01)
*H04L 12/66* (2006.01)
*H04W 8/26* (2009.01)

(52) U.S. Cl.
CPC .......... *H04L 61/2015* (2013.01); *H04L 12/66* (2013.01); *H04L 61/6068* (2013.01); *H04W 4/70* (2018.02); *H04W 8/26* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2016/0119436 A1 | 4/2016 | Karlsson et al. | |
| 2018/0213378 A1* | 7/2018 | Brown | H04L 67/12 |
| 2020/0067903 A1* | 2/2020 | Yegorin | H04L 63/0807 |

OTHER PUBLICATIONS

International Search Report and Written Opinion of the International Searching Authority, PCT/EP2017/059008, dated Jan. 18, 2018, 25 pages.
J. Palet Martinez Consulintel, S.L., "Basic Requirements for IPv6 Customer Edge Routers", IPv6 Operations (v6ops), Mar. 31, 2017, XP15119068A1, pp. 1-30.
T. Huth et al., "DHCPv6 Options for Network Boot", Internet Engineering Task Force (IETF), Sep. 2010, XP15073004A1, pp. 1-12.

(Continued)

*Primary Examiner* — Azizul Choudhury
(74) *Attorney, Agent, or Firm* — Sage Patent Group

(57) ABSTRACT

There is provided mechanisms for configuring a message brokering service address in an M2M device. A method is performed by a gateway. The method comprises sending a request to a DHCP server for configuration. The method comprises receiving a response from the DHCP server comprising at least address information assigned to the gateway. The method comprises receiving an MQTT_BROKER_URI representing the message brokering service address from a node.

18 Claims, 7 Drawing Sheets

(56) References Cited

OTHER PUBLICATIONS

S. Nalluri et al., "DHCPv6 Options for LWM2M bootstrap information", DHC working group, Feb. 11, 2017, XP15117897A1, pp. 1-10.
Jorge E Luzuriaga et al., "Handling mobility in IoT applications using the MQTT protocol (Author Version)", 2015 Internet Technologies and Applications (ITA), IEEE, Sep. 8, 2015, XP032812272, pp. 1-6.
Anonymous: "Broker Auto Discovery", Dec. 2, 2013, XP055439634, Retrieved from the Internet: URL: https://github.com/mqtt/mqtt.github.io/wiki/broker auto-discovery [Retrieved on Jan. 10, 2018].
Examination Report for Indian Patent Application No. 201917041310 dated Jan. 28, 2021.
Communication pursuant to Article 94(3) EPC for European Patent Application No. 17718873.7 dated Feb. 15, 2021.
Babovic Zoran B et al., "Web Performance Evaluation for Internet of Things Applications," IEEE Access, vol. 4 (2016) pp. 6974-6992.

\* cited by examiner

CONFIGURATION OF AN M2M DEVICE

This application is a 35 U.S.C. § 371 national stage application of PCT International Application No. PCT/EP2017/059008 filed on Apr. 13, 2017, the disclosure and content of which is incorporated by reference herein in its entirety.

TECHNICAL FIELD

Embodiments presented herein relate to methods, a gateway, an M2M device, a DHCP server, computer programs, and a computer program product for configuring a message brokering service address in an M2M device.

BACKGROUND

The Internet-of-Things (IoT) is generally referred to as a network of physical smart objects such as sensors that exchange information with other sensors, devices or servers, without human interaction. As such, these devices are sometimes referred to as machine-to-machine (M2M) devices. Some examples of services in IoT include built-in sensors in automobiles or homes, heart monitoring implants or smart thermostats systems. Many new protocols have been developed after the introduction of IoT including Lightweight Machine to Machine protocol (LWM2M) and constrained application protocol (CoAP), both of which are light and compact application protocols.

M2M devices may communicate with other M2M devices and systems using wireless or wired technology. Regarding wireless technologies, M2M devices may support short range communication technologies such as Bluetooth, Wi-Fi and Zigbee. They may also support long range radio technologies however this is often more power consuming than short range communication.

There is a desire to improve the configurability of M2M devices so that they can more easily be adapted to changes in a network, for example if the M2M device is communicating with a malfunctioning or misbehaving server, or if there is a change in ownership.

SUMMARY

The Message Queue Telemetry Transport (MQTT) protocol is a light-weight IoT protocol, based on the publish/subscribe communication model. MQTT clients, that can be publishers or subscribers, communicate with each other via an MQTT broker. The MQTT broker hosts a set of "topics" and MQTT clients can publish and subscribe to these topics. All data sent (published) to a topic is delivered to all MQTT clients subscribing to the same topic. In communications network using MQTT, MQTT clients commonly use pre-configured address information, such as Uniform Resource Identifier (URI), to register with an MQTT broker. The URI might be configured by a user or an operator through a local device interface. Alternatively, the URI might be provided as a hardcoded value during manufacturing of the MQTT clients. An MQTT client might run either in a gateway or in an M2M device.

The MQTT clients thus use a pre-configured well-known address for contacting the bootstrapping service provided by the MQTT broker. The bootstrapping service will be used to redirect the M2M devices (using the MQTT clients) to the server (such as a dynamic host configuration protocol, DHCP, server) that the M2M devices need to interact for serving their purpose in a service or application.

Preconfiguring the MQTT clients with the URI of the MQTT broker leads to a static mapping of MQTT clients to a particular MQTT broker, and thus of M2M devices to a particular MQTT broker. However, there is a possibility that the preconfigured URI might not be valid by the time the MQTT clients try to contact the MQTT broker. Further, static configuration of the URI makes any configuration changes cumbersome and time consuming for the user of the M2M device. Also, many types of M2M devices lack any kind of user interface making any such configuration inconvenient.

An object of embodiments herein is therefore to provide efficient provision of a message brokering service address in an M2M device.

According to a first aspect there is presented a method for configuring a message brokering service address in an M2M device. The method is performed by a gateway. The method comprises sending a request to a DHCP server for configuration. The method comprises receiving a response from the DHCP server comprising at least address information assigned to the gateway. The method comprises receiving an MQTT_BROKER_URI representing the message brokering service address from a node.

According to a second aspect there is presented a gateway for configuring a message brokering service address in an M2M device. The gateway comprises processing circuitry. The processing circuitry is configured to cause the gateway to send a request to a DHCP server for configuration. The processing circuitry is configured to cause the gateway to receive a response from the DHCP server comprising at least address information assigned to the gateway. The processing circuitry is configured to cause the gateway to receive an MQTT_BROKER_URI representing the message brokering service address from a node.

According to a third aspect there is presented a gateway for configuring a message brokering service address in an M2M device. The gateway comprises processing circuitry and a storage medium. The storage medium stores instructions that, when executed by the processing circuitry, cause the gateway to perform operations, or steps. The operations, or steps, cause the gateway to send a request to a DHCP server for configuration. The operations, or steps, cause the gateway to receive a response from the DHCP server comprising at least address information assigned to the gateway. The operations, or steps, cause the gateway to receive an MQTT_BROKER_URI representing the message brokering service address from a node.

According to a fourth aspect there is presented a gateway for configuring a message brokering service address in an M2M device. The gateway comprises a send module configured to send a request to a DHCP server for configuration. The gateway comprises a receive module configured to receive a response from the DHCP server comprising at least address information assigned to the gateway. The gateway comprises a receive module configured to receive an MQTT_BROKER_URI representing the message brokering service address from a node.

According to a fifth aspect there is presented a computer program for configuring a message brokering service address in an M2M device. The computer program comprises computer program code which, when run on processing circuitry of a gateway, causes the gateway to perform a method according to the first aspect.

According to a sixth aspect there is presented a method for an M2M device is configured with a message brokering service address. The method is performed by the M2M device. The method comprises sending a request for an Internet Protocol address to a gateway. The method comprises receiving a response from the gateway. The response comprises the Internet Protocol address as assigned to the M2M device and an MQTT_BROKER_URI representing the message brokering service address.

According to a seventh aspect there is presented an M2M device for the M2M device to be configured with a message brokering service address. The M2M device comprises processing circuitry. The processing circuitry is configured to cause the M2M device to send a request for an Internet Protocol address to a gateway. The processing circuitry is configured to cause the M2M device to receive a response from the gateway. The response comprises the Internet Protocol address as assigned to the M2M device and an MQTT_BROKER_URI representing the message brokering service address.

According to an eighth aspect there is presented an M2M device for the M2M device to be configured with a message brokering service address, M2M device comprises processing circuitry and a storage medium. The storage medium stores instructions that, when executed by the processing circuitry, cause the M2M device to perform operations, or steps. The operations, or steps, cause the M2M device to send a request for an Internet Protocol address to a gateway. The operations, or steps, cause the M2M device to receive a response from the gateway. The response comprises the Internet Protocol address as assigned to the M2M device and an MQTT_BROKER_URI representing the message brokering service address.

According to a ninth aspect there is presented an M2M device for the M2M device to be configured with a message brokering service address. The M2M device comprises a send module configured to send a request for an Internet Protocol address to a gateway. The M2M device comprises a receive module configured to receive a response from the gateway. The response comprises the Internet Protocol address as assigned to the M2M device and an MQTT_BROKER_URI representing the message brokering service address.

According to a tenth aspect there is presented a computer program for an M2M device to be configured with a message brokering service address. The computer program comprises computer program code which, when run on processing circuitry of the M2M device, causes the M2M device to perform a method according to the sixth aspect.

According to an eleventh aspect there is presented a method for configuring a message brokering service address in an M2M device. The method is performed by a DHCP server. The method comprises receiving a request for configuration. The method comprises sending a response to the gateway comprises at least address information assigned to the gateway. The method comprises sending, to the gateway, an MQTT_BROKER_URI representing the message brokering service address.

According to a twelfth aspect there is presented a DHCP server for configuring a message brokering service address in an M2M device. The DHCP server comprises processing circuitry. The processing circuitry is configured to cause the DHCP server to receive a request for configuration. The processing circuitry is configured to cause the DHCP server to send a response to the gateway comprises at least address information assigned to the gateway. The processing circuitry is configured to cause the DHCP server to send, to the gateway, an MQTT_BROKER_URI representing the message brokering service address.

According to a thirteenth aspect there is presented a DHCP server for configuring a message brokering service address in an M2M device. The DHCP server comprises processing circuitry and a storage medium. The storage medium stores instructions that, when executed by the processing circuitry, cause the DHCP server to perform operations, or steps. The operations, or steps, cause the DHCP server to receive a request for configuration. The operations, or steps, cause the DHCP server to send a response to the gateway comprises at least address information assigned to the gateway. The operations, or steps, cause the DHCP server to send, to the gateway, an MQTT_BROKER_URI representing the message brokering service address.

According to a fourteenth aspect there is presented a DHCP server for configuring a message brokering service address in an M2M device. The DHCP server comprises a receive module configured to receive a request for configuration. The DHCP server comprises a send module configured to send a response to the gateway comprises at least address information assigned to the gateway. The DHCP server comprises a send module configured to send, to the gateway, an MQTT_BROKER_URI representing the message brokering service address.

According to a fifteenth aspect there is presented a computer program for configuring a message brokering service address in an M2M device, the computer program comprising computer program code which, when run on processing circuitry of DHCP server, causes the DHCP server to perform a method according to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these gateways, these M2M devices, these DHCP servers, and these computer programs provide efficient provision of a message brokering service address in an M2M device.

Advantageously these methods, these gateways, these M2M devices, these DHCP servers, and these computer programs remove the need to have pre-defined well-known address for the bootstrapping service in Internet Protocol networks and thus lower the operational cost and simplify any needed configuration changes.

Advantageously these methods, these gateways, these M2M devices, these DHCP servers, and these computer programs enable a resource to be added to the gateway that is observable by an MQTT broker, which helps in validating bootstrap requests and MQTT connect requests received from MQTT clients.

It is to be noted that any feature of the first, second, third, fourth, fifth, sixth seventh, eight, ninth, tenth, eleventh, twelfth, thirteen, fourteenth, fifteenth and sixteenth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
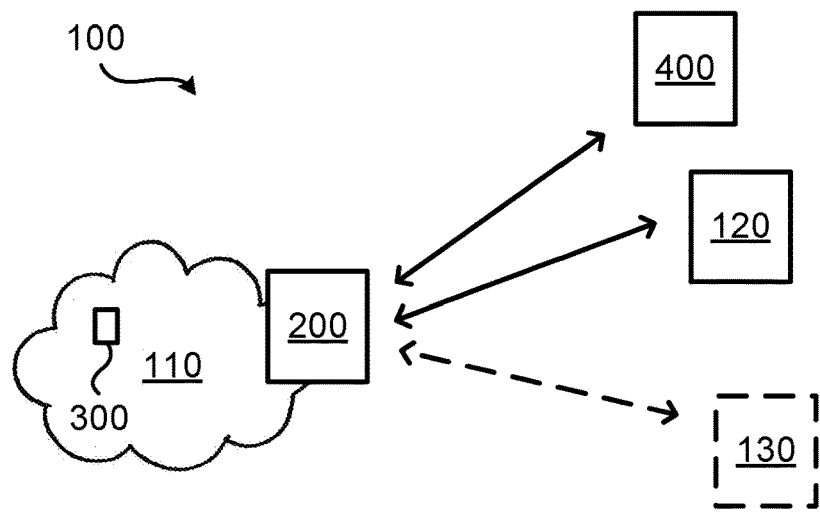
FIG. 1 is a schematic diagram illustrating a communication network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The term M2M device used herein should be understood to be any device which is configured or configurable to communicate with another device, server or system without human interaction. The M2M device may for example be a sensor for light, pressure, temperature, vibration or actuators. The M2M device may form part of an apparatus such as a vehicle, an appliance (including a fridge, freezer or central heating), or a user equipment (such as a mobile phone, laptop, smart phone, wireless communication device).

The term gateway used herein is a network point or node that acts as an entrance to another network. It controls traffic to and from the network which it acts as a gateway for. A gateway may be considered to have the functions of a router in that it knows where to direct a given packet of data, and a switch, which furnishes the actual path in and out of the gateway for a given packet.

Some of the herein disclosed embodiments make use of DHCP in order to configuring a message brokering service address in an M2M device. DHCP is an internet application protocol that uses a client/server model to communicate between hosts. DHCP executes over the User Datagram Protocol (UDP) transport protocol. It provides a mechanism to auto-configure inter-link Host Internet Protocol addresses, provides parameters to auto-register and receives Domain Name System Host names and provides a mechanism to specify additional configuration options in the protocol.

An extension of DHCP is DHCPv6 Prefix Delegation (DHCPv6 PD) as specified in RFC3633 of the Internet Engineering Task Force (IETF). DHCPv6 PD is aimed at assigning complete subnets and other network and interface parameters from a DHCPv6 server to a DHCPv6 PD client. This means that instead of a single address assignment, DHCPv6 PD will assign a set of IPv6 subnets, or a prefix of Internet Protocol version 6 (IPV6) addresses, for example 2001:db8::/60. This means that the client who has received the IPv6 subnets, or IPv6 address prefix, can assign IPv6 addresses dynamically to its IPv6 enabled interfaces.

Some of the herein disclosed embodiments make use of another extension of DHCP, referred to as Identity Association for Prefix Delegation (IA_PD) which is specified in RFC3633 of the IETF. IA_PD is similar to PD in that prefixes are assigned to a client. IA_PD is a collection of prefixes assigned to a requesting client. Each IA_PD has an associated Identity Association Identifier (IAID). A requesting client may have more than one IA_PD assigned to it; for example, one for each of its interfaces. An IA_PD is a construct through which a delegating server and a requesting client can identify, group and manage a set of related IPv6 prefixes. Each IA_PD consists of an IAID and associated configuration information. An IA_PD for prefixes is the equivalent of an Identity Association (IA) for addresses as described in RFC3315 of IETF.

In some aspects, a client receiving a prefix of Internet Protocol addresses can be considered to be a gateway. The gateway configures and assigns an Internet Protocol address to M2M devices which form part of its local network. The gateway also receives a Uniform Resource Identifier together with the prefix of Internet protocol addresses and forwards the Uniform Resource Identifier to the M2M devices.

FIG. 1 is a schematic diagram illustrating a communications network 100 where embodiments presented herein can be applied. A gateway 200 and an M2M device 300 form part of a local network 110. The gateway 200 is configured to communicate with a DHCP server 400 and an MQTT broker node 120, and optionally an LWM2M server 130. As mentioned above, before the gateway 200 delegates an IP address to the M2M device 300, it must first receive at least a prefix of an IP address from the DHCP server 400.

The embodiments disclosed herein particularly relate to mechanisms for configuring a message brokering service address in an M2M device 300. In order to obtain such mechanisms there is provided a gateway 200, a method performed by the gateway 200, a computer program product comprising code, for example in the form of a computer program, that when run on processing circuitry of the gateway 200, causes the gateway 200 to perform the method. In order to obtain such mechanisms there is further provided an M2M device 300, a method performed by the M2M device 300, and a computer program product comprising code, for example in the form of a computer program, that when run on processing circuitry of the M2M device 300, causes the M2M device 300 to perform the method. In order to obtain such mechanisms there is further provided a DHCP server 400, a method performed by the DHCP server 400, and a computer program product comprising code, for example in the form of a computer program, that when run on processing circuitry of the DHCP server 400, causes the DHCP server 400 to perform the method.

Figure 2:
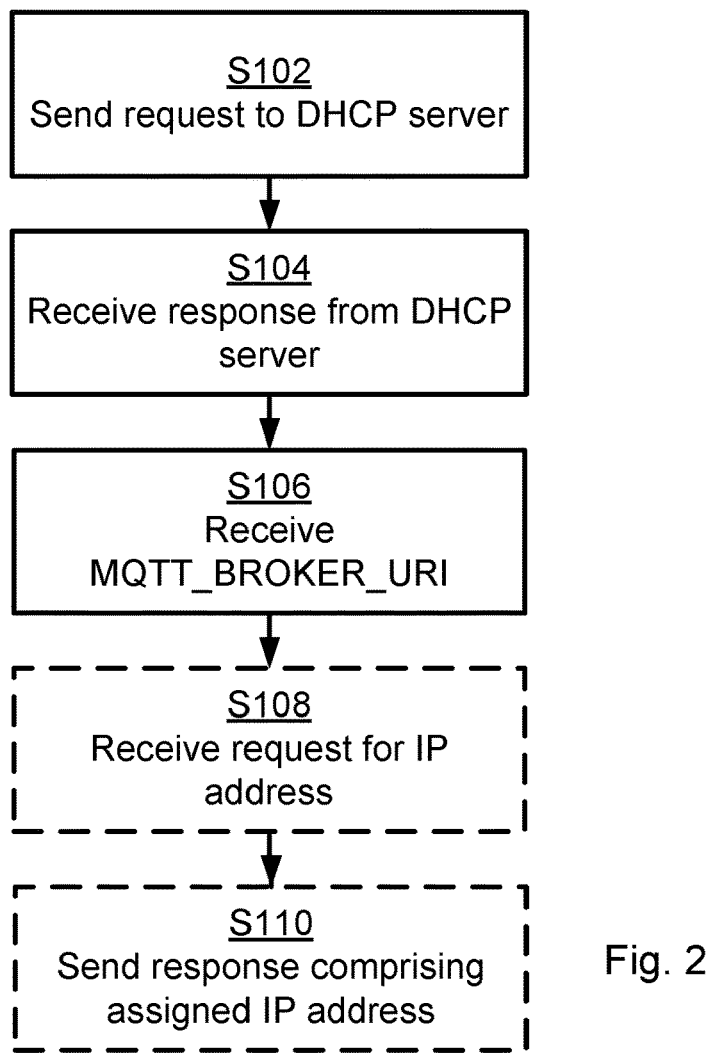
FIGS. 2, 7, and 8 are flowcharts of methods according to embodiments.
Figure 7:
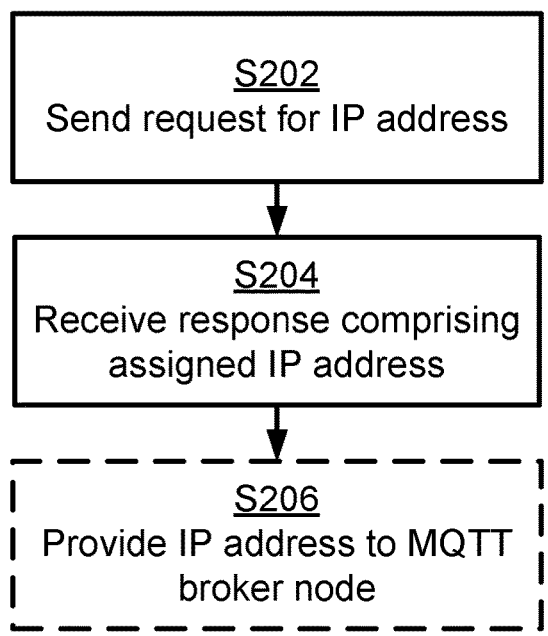
Figure 8:
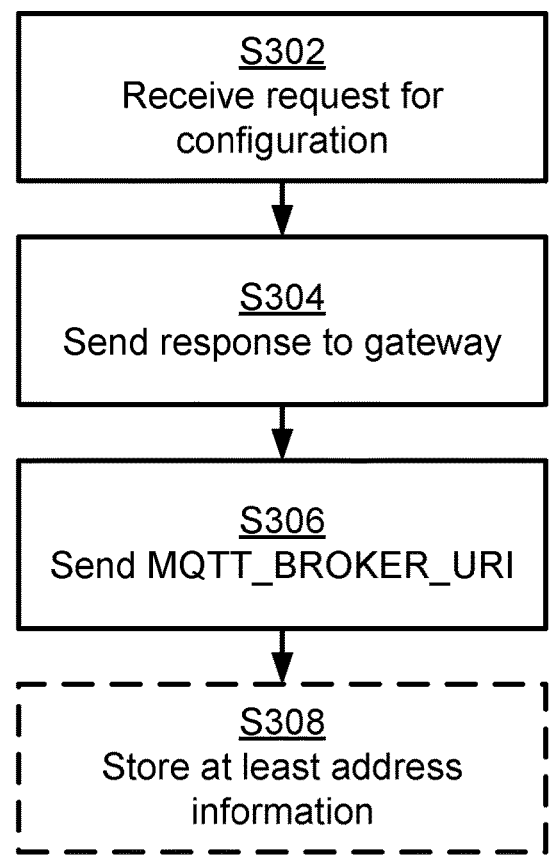

FIG. 2 is a flowchart illustrating embodiments of methods for configuring a message brokering service address in an M2M device 300 as performed by the gateway 200. FIG. 7 is a flowchart illustrating embodiments of methods for an M2M device 300 to be configured with a message brokering service address as performed by the M2M device 300. FIG. 8 is a flowchart illustrating embodiments of methods for configuring a message brokering service address in an M2M device 300 as performed by the DHCP server 400. The methods are advantageously provided as computer programs.

Reference is now made to FIG. 2 illustrating a method for configuring a message brokering service address in an M2M device 300 as performed by the gateway 200 according to an embodiment.

The gateway 200 sends a request for configuration, such as an identity association for prefix delegation (IA_PD), to the DHCP server 400. Hence, the gateway 200 is configured to perform step S102:

S102: The gateway 200 sends a request to the DHCP server 400 for configuration.

The DHCP server 400 assigns prefix(es) or complete address(es) to the gateway 200. Hence, the gateway 200 is configured to perform step S104:

S104: The gateway 200 receives a response from the DHCP server 400 comprising at least address information assigned to the gateway 200.

The configuration in step S102 could be IA_PD. The address information in step S104 could be at least a prefix of an Internet Protocol address.

In general terms, a Uniform Resource Identifier (URI) is a compact sequence of characters that identifies an abstract or physical resource. The syntax for URI is defined in IETF RFC3986. MQTT_BROKER_URI uniquely identifies the MQTT broker to which the MQTT client establishes connectivity. As part of the delegation reply, as defined by the response received in step S104, the gateway 200 receives options called Message Queue Telemetry Transport protocol Broker Uniform Resource Identifier (MQTT_BROKER_URI). Hence, the gateway 200 is configured to perform step S106:

S106: The gateway 200 receives an MQTT_BROKER_URI representing the message brokering service address from a node. According to an embodiment the node is the DHCP server 400.

In this way the gateway is configured with the URI of available MQTT broker(s) to which the MQTT client could establish connection.

Embodiments relating to further details of configuring a message brokering service address in an M2M device 300 as performed by the gateway 200 will now be disclosed.

Once the prefix delegation is done, an MQTT client running on the gateway 200 might register itself to the MQTT broker node 120 and the MQTT broker node 120 may validate the IP address of the MQTT client (as identified by the prefix received by the gateway 200 in step S104). The MQTT broker node 120 could be configured to ignore connect requests if the IP address of the MQTT client does not belong to a list of IP addresses served by the DHCP server 400. This is possible if the DHCP server 400 is in sync with the MQTT broker node 120 in terms of IP addresses assigned to the gateway 200.

In some aspects the MQTT_BROKER_URI is sent to the M2M device 300 upon request. Hence, according to an embodiment the gateway 200 is configured to perform optional step S108 and step S110:

S108: The gateway 200 receives a request for an Internet Protocol address from the M2M device 300.

S110: The gateway 200 sends a response to the M2M device 300. The response comprises the Internet Protocol address as assigned to the M2M device and the MQTT_BROKER_URI.

Aspects relating to embodiments where the DHCP server 400 is an Internet Protocol version six DHCP (DHCPv6) server will now be disclosed. The Internet Protocol address could then be an Internet Protocol address version six (IPv6) address.

Figure 3:
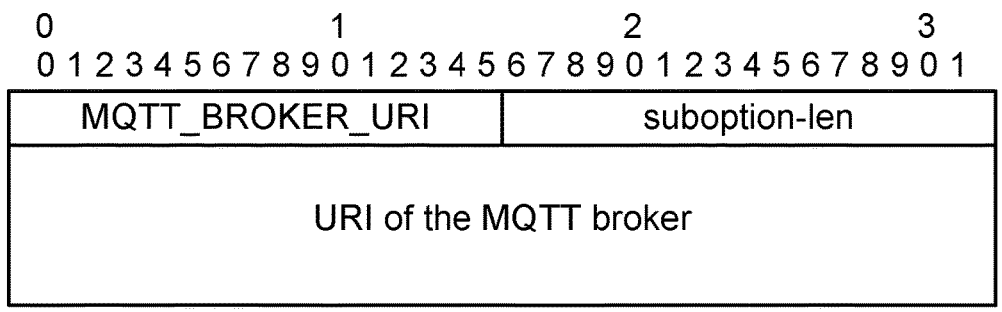
FIGS. 3, 5, and 9 are schematic illustration of data structures according to embodiments.

FIG. 3 schematically illustrates a data structure of a response from the DHCP server 400 according to an embodiment where the DHCP server 400 is a DHCPv6 server.

According to an embodiment the MQTT_BROKER_URI is received in a DHCP advertise message.

According to an embodiment, reception of the DHCP advertise message is preceded by transmission of a DHCP solicit message from the gateway 200 to the DHCP server 400. The DHCP solicit message comprises the request for configuration. Thus the request sent in step S102 could be part of a DHCP solicit message.

Figure 4:
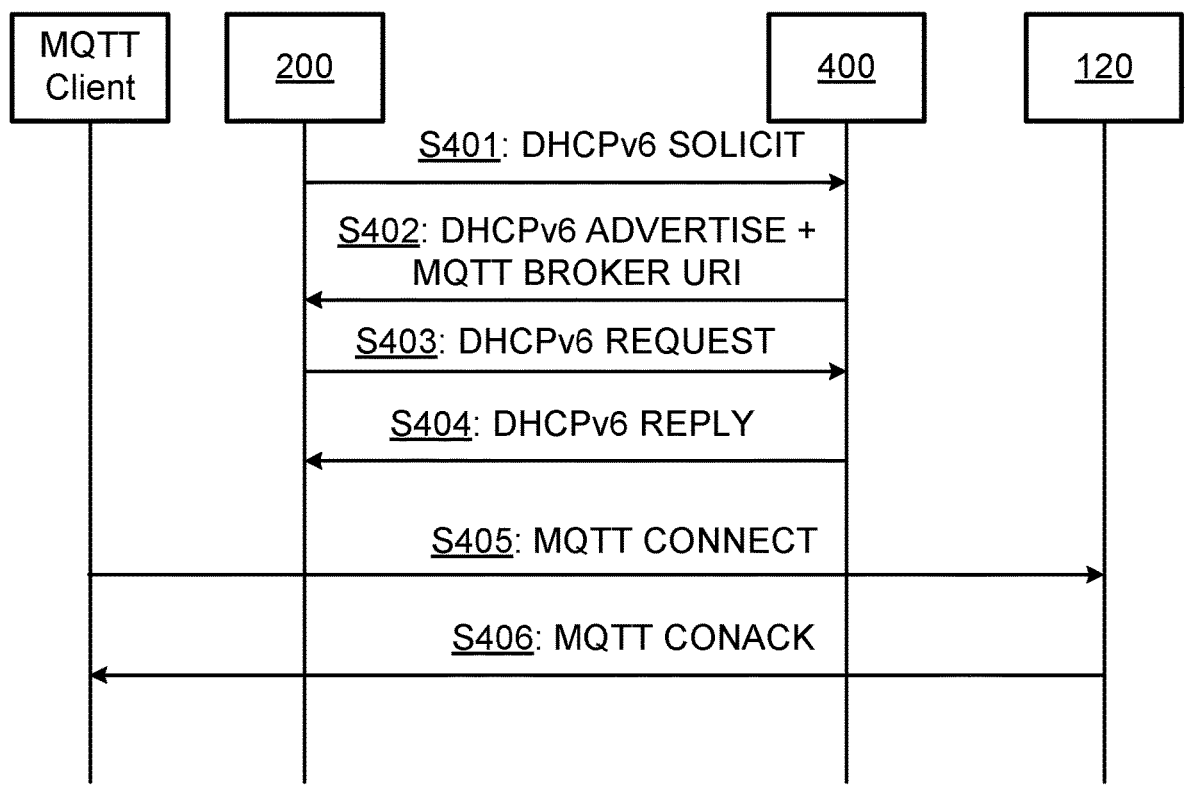
FIGS. 4, 6, and 10 are signalling diagrams according to embodiments.

FIG. 4 is a signalling diagram for configuring a message brokering service address according to an embodiment where the DHCP server 400 is a DHCPv6 server.

S401: The gateway 200 (acting as a DHCP client) sends a DHCPv6 solicit message to a reserved multicast address to discover the DHCP server 400 where DHCPv6 solicit message comprises a request for the IA_PD.

S402: The DHCP server 400 responds with a DHCPv6 advertise message comprising the MQTT_BROKER_URI.

S403: If DHCP is used also for stateful IPv6 address assignment, gateway 200 sends a DHCPv6 request message to the DHCP server 400 for IP address assignment.

S404: The DHCP server 400 responds with a DHCPv6 reply message to the gateway 200 with IP address assignment information.

In general terms, steps S401-S404 are then repeated but with the M2M device 300 acting as the DHCP client and with the gateway 200 acting as the DHCP server 400 in order for the M2M device 300 to obtain IP address assignment information from the gateway 300.

S405: The MQTT client sends an MQTT connect message to the MQTT broker node 120 using the address information from the MQTT_BROKER_URI option.

S406: The MQTT broker node 120 responds with an MQTT connection acknowledgement message (CONACK) to the MQTT client in case of successful registration.

The MQTT client can be either in the gateway 200 or the M2M device 300.

Aspects relating to embodiments where the DHCP server 400 is an Internet Protocol version four DHCP (DHCPv4) server will now be disclosed. The Internet Protocol address could then be an Internet Protocol address version four (IPv4) address.

Figure 5:
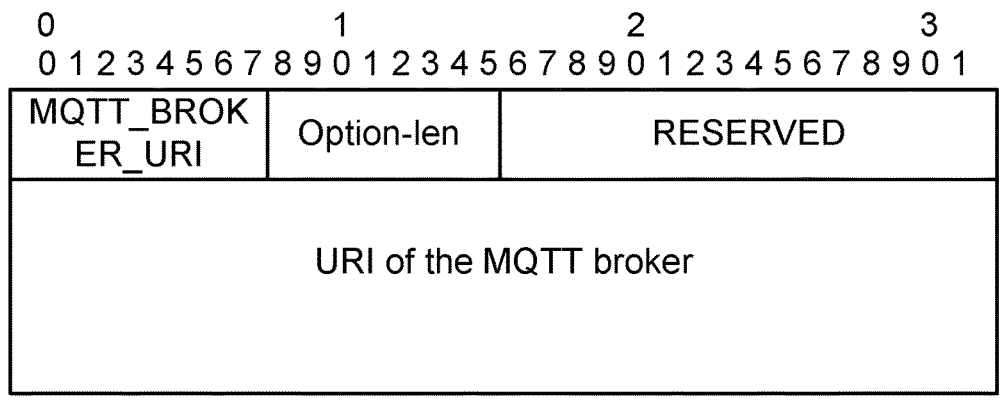

FIG. 5 schematically illustrates a data structure of a response from the DHCP server 400 according to an embodiment where the DHCP server 400 is a DHCPv4 server. The Internet Protocol address could then be an Internet Protocol address version four (IPv4) address. Further, the response in step S104 could complete Internet Protocol address assigned to the gateway 200 (and hence not just a prefix of the Internet Protocol address).

According to an embodiment the MQTT_BROKER_URI is received in a DHCP offer message.

According to an embodiment, reception of the DHCP offer message is preceded by transmission of a DHCP discover message from the gateway 200 to the DHCP server 400. Thus the request sent in step S102 could be part of a DHCP discover message.

Figure 6:
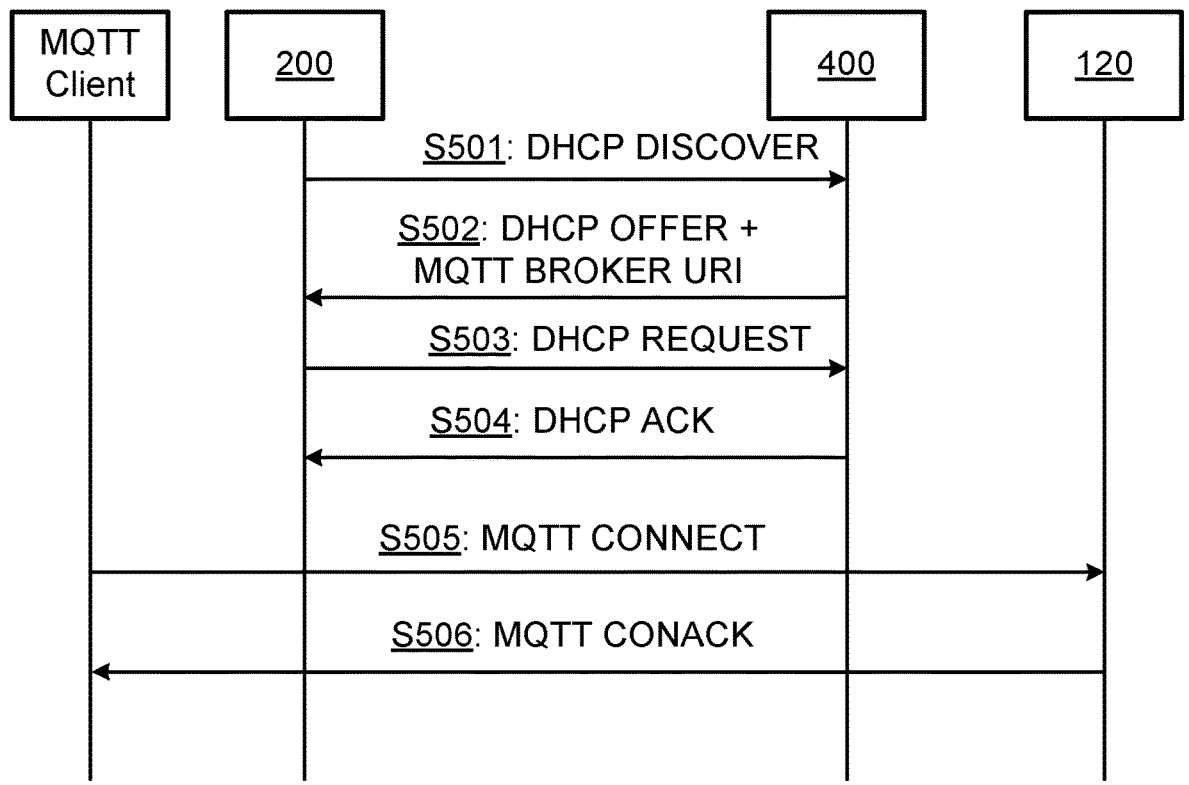

FIG. 6 is a signalling diagram for configuring a message brokering service address according to an embodiment where the DHCP server 400 is a DHCPv4 server.

S501: The gateway 200 (acting as a DHCP client) sends a DHCP discover message to find the DHCP server 400.

S502: The DHCP server 400 responds with a DHCP offer message comprising the MQTT_BROKER_URI.

S503: The gateway 200 sends a DHCP request message to the DHCP server 400 for IP address assignment.

S504: The DHCP server 400 responds with a DHCP acknowledgement (ACK) message to the gateway 200 with IP address assignment information to acknowledge the IP address assignment of the gateway 200.

In general terms, steps S501-S504 are then repeated but with the M2M device 300 acting as the DHCP client and with the gateway 200 acting as the DHCP server 400 in order for the M2M device 300 to obtain IP address assignment information from the gateway 300.

S505: The MQTT client sends an MQTT connect message to the MQTT broker node 120 using the address information from the MQTT_BROKER_URI option.

S506: The MQTT broker node 120 responds with an MQTT connection acknowledgement message (CONACK) to the MQTT client in case of successful registration.

The MQTT client can be either in the gateway 200 or the M2M device 300.

Reference is now made to FIG. 7 illustrating a method for an M2M device 300 to be configured with a message brokering service address as performed by the M2M device 300 according to an embodiment.

As disclosed above, the gateway 200 could in a step S108 receive a request for an Internet Protocol address from the M2M device 300. Particularly, the M2M device 300 is configured to perform step S202:

S202: The M2M device 300 sends a request for an Internet Protocol address to a gateway 200.

As disclosed above, the gateway 200 could in a step S110 send a response to the M2M device 300. Particularly, the M2M device 300 is configured to perform step S204:

S204: The M2M device 300 receives a response from the gateway 200. The response comprises the Internet Protocol address as assigned to the M2M device 300 and an MQTT_BROKER_URI that represents the message brokering service address.

Embodiments relating to further details of the M2M device 300 being configured with a message brokering service address as performed by the M2M device 300 will now be disclosed.

In some aspects the M2M device 300 registers itself to the MQTT broker node 120 in order for MQTT broker node 120 to validate the IP address of M2M device 300. Hence, according to an embodiment the M2M device 300 is configured to perform optional step S206:

S206: The M2M device 300 provides the Internet Protocol address to the MQTT broker node 120 when registering with the MQTT broker node 120.

The MQTT broker node 120 might ignore the connect request if the IP address does not belong to list of IP addresses served by the DHCP server 400. That is, according to an embodiment the registering in step S206 is unsuccessful when the Internet Protocol address does not belong to a list of Internet Protocol addresses served by the DHCP server 400.

Reference is now made to FIG. 8 illustrating a method for configuring a message brokering service address in an M2M device 300 as performed by the DHCP server 400 according to an embodiment.

As disclosed above, the gateway 200 in step S102 sends a request to the DHCP server 400. Hence, the DHCP server 400 is configured to perform step S302:

S302: The DHCP server 400 receives a request for configuration. In an embodiment the request is received from the gateway 200.

Upon having received the request the DHCP server 400 sends a response to the gateway 200. Hence, the DHCP server 400 is configured to perform step S304:

S304: The DHCP server 400 sends a response to the gateway 200. The response comprises at least address information assigned to the gateway 200.

The DHCP server 400 further sends the MQTT_BROKER_URI. Hence, the DHCP server 400 is configured to perform step S304:

S306: The DHCP server 400 sends, to the gateway 200, an MQTT_BROKER_URI that represents the message brokering service address.

The configuration in step S302 could be IA_PD. The address information in step S304 could be at least a prefix of an Internet Protocol address.

Embodiments relating to further details of configuring a message brokering service address in an M2M device 300 as performed by the DHCP server 400 will now be disclosed.

As disclosed above, in some aspects the DHCP server 400 is in sync with the MQTT broker node 120 in terms of IP addresses assigned to the gateway 200. Therefore, according to an embodiment the DHCP server 300 is configured to perform optional step S308:

S308: The DHCP server 300 stores at least said given Internet Protocol addresses in a list of Internet Protocol addresses served by the DHCP server.

This enables the DHCP server 400 is in sync with the MQTT broker node 120 in terms of IP addresses assigned to the gateway 200.

Aspects relating to configuring a device management bootstrapping service address in the M2M device 300 will now be disclosed.

Embodiments of methods for configuring a device management bootstrapping service address in an M2M device 300 as performed by the gateway 200 will now be disclosed The gateway 200 sends a request to the DHCP server 400 for an Internet Protocol address. The request could be sent in a DHCP discover message.

In some aspects the DHCP server 400 is a DHCPv4 server. The DHCP server 400 assigns an Internet Protocol address to the gateway 200.

The gateway 200 receives a response from the DHCP server 400. The response comprises the Internet Protocol address as assigned to the gateway 200.

As part of this address assigning message sequence the gateway 200 receives an option called Lightweight M2M protocol bootstrapping Uniform Resource Identifier (LWM2M_BOOTSTRAPPING_URI). Thus, the gateway 200 receives an LWM2M_BOOTSTRAPPING_URI that represents the device management bootstrapping service address from a node. According to an embodiment the node is the DHCP server 400.

Figure 9:
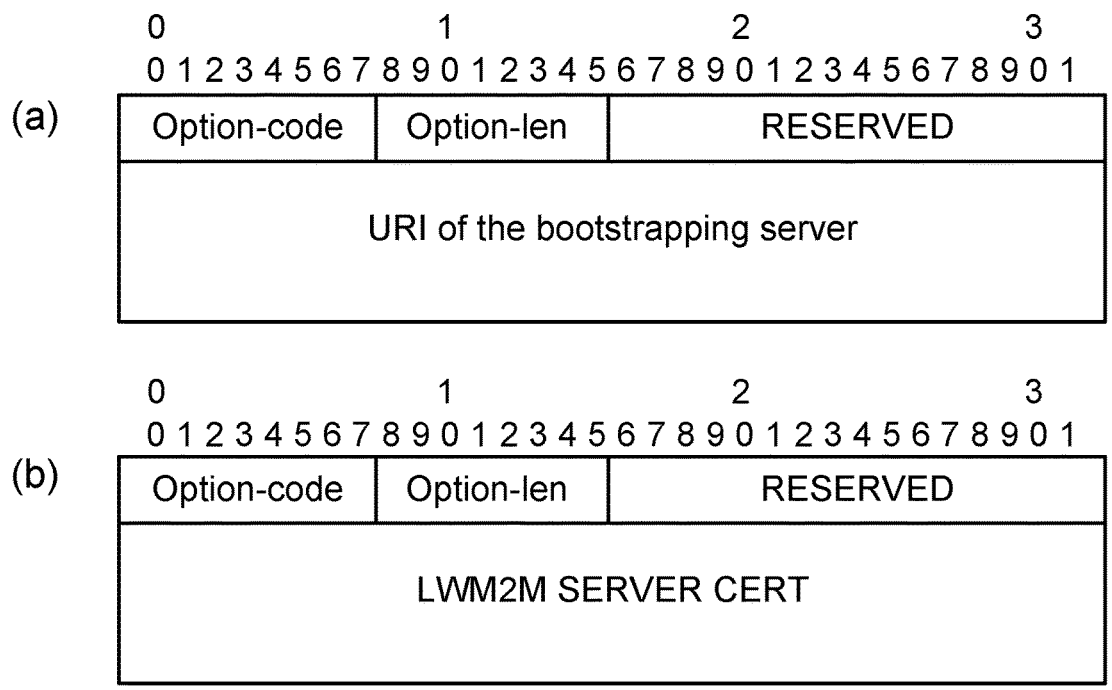

FIG. 9(a) schematically illustrates a data structure of a response from the DHCP server 400 according to an embodiment where the response comprises the LWM2M_BOOTSTRAPPING_URI.

According to an embodiment the LWM2M_BOOTSTRAPPING_URI is sent to the M2M device 300. That is, according to an embodiment the gateway 200 receives a request for the Internet Protocol address from the M2M device 300. The gateway 200 then sends a response to the M2M device 300. The response comprises the Internet Protocol address as assigned to the M2M device 300 and the LWM2M_BOOTSTRAPPING_URI.

As part of the address assigning message sequence the gateway 200 could receive an option called lightweight M2M protocol server certificate (LWM2M_SERVER_CERT). That is, according to an embodiment the gateway 200 receives a representation of the LWM2M_SERVER_CERT from the node.

FIG. 9(b) schematically illustrates a data structure of a response from the DHCP server 400 according to an embodiment where the response comprises the LWM2M_SERVER_CERT.

The gateway 200 configures these options to be used as part of local DHCPv4 server configuration which might be serving IPv4 addresses in a private network, such as the network 110.

Once address assignment is performed the gateway 200 could register itself to the LWM2M server 130 and the LWM2M server 130 may request observe notifications from the gateway 200 for getting indications of new M2M devices 300 connecting to the communications network 100.

Unlike for DHCPv6, the maximum possible value of the DHCP "option-len" is only 255 bytes. LWM2M server certificates are commonly larger than 255 bytes. To accommodate larger certificates, multiple LWM2M_SERVER_CERT options could be included in the same DHCP message. Certificates larger than 255 bytes could be fragmented and adjusted in a minimum possible number of LWM2M_SERVER_CERT options. Each LWM2M_SERVER_CERT option in the scope of DHCP packet could be tagged with sequence number so that DHCP client can reassemble the certificate.

The representation of the LWM2M_SERVER_CERT could thus be the LWM2M_SERVER_CERT itself.

Alternatively, the representation of the LWM2M_SERVER_CERT could be a cryptographic hash of the LWM2M_SERVER_CERT. That is, alternatively only a fingerprint (as defined by the cryptographic hash) of the certificate is included in the DHCP message. When connecting to the MQTT broker 120 or LWM2M server 130 the M2M device 300 then obtains the full certificate and can check if the fingerprint of the full certificate matches the fingerprint given by the DHCP server 400.

According to an embodiment the LWM2M_SERVER_CERT is sent to the M2M device 300. That is, according to an embodiment the gateway 200 sends the representation of the LWM2M_SERVER_CERT to the M2M device 300.

Figure 10:
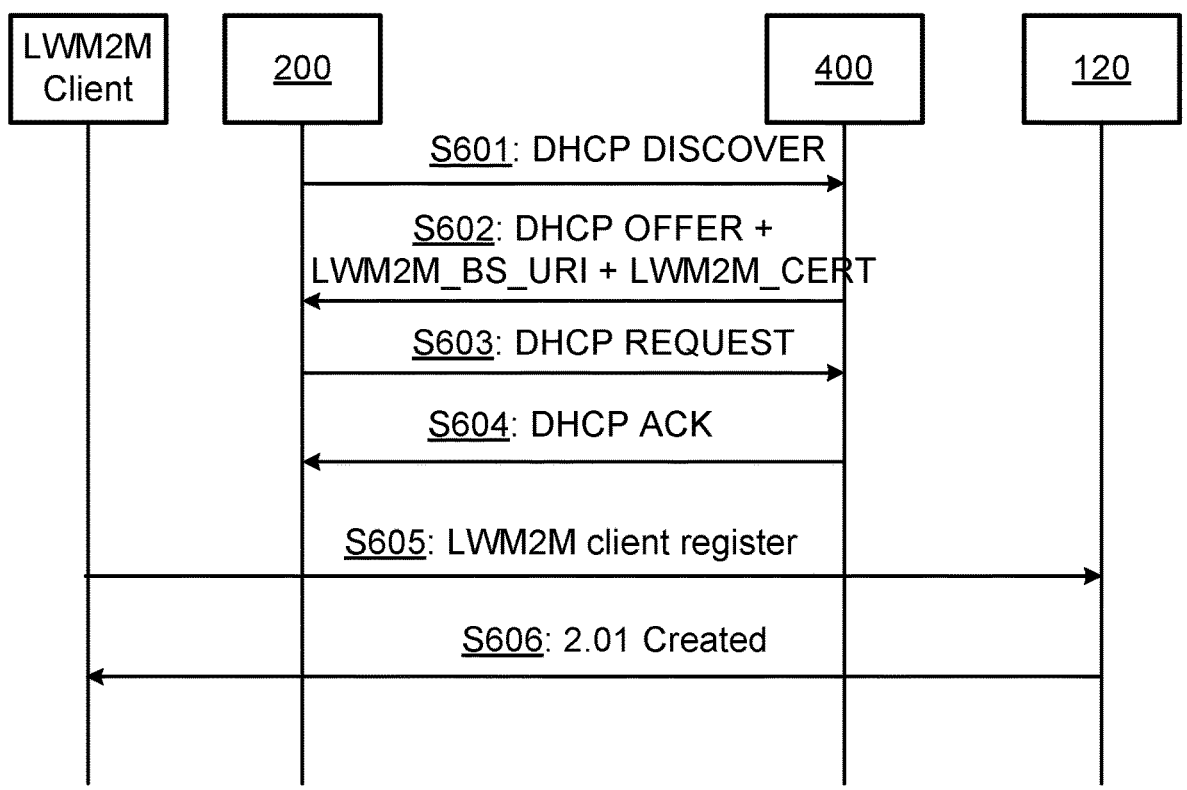

FIG. 10 is a signalling diagram for configuring a device management bootstrapping service address in an M2M device 300.

S601: The gateway 200 (acting as a DHCP client) sends a DHCP discover message to the DHCP server 400 where DHCP discover message comprises a request for an Internet Protocol address.

S602: The DHCP server 400 responds with a DHCP offer message comprising the LWM2M_BOOTSTRAPPING_URI and the LWM2M_SERVER_CERT.

S603: The gateway 200 sends a DHCP request message to the DHCP server 400 for address configuration.

S604: The DHCP server 400 responds with a DHCP acknowledgement (ACK) message to the gateway 200 with IP address assignment information to confirm the address assignment of the gateway 200.

In general terms, steps S601-S604 are then repeated but with the M2M device 300 acting as the DHCP client and with the gateway 200 acting as the DHCP server 400 in order for the M2M device 300 to obtain the address assignment information from the gateway 300.

S605: The LWM2M client sends a LWM2M client register message to the LWM2M sever 130 for registration of the LWM2M client.

S606: The LWM2M sever 130 responds with a 2.01 Created message to the LWM2M client in case of successful registration.

The LWM2M client can be either in the gateway 200 or the M2M device 300.

Embodiments of methods for the M2M device 300 to be configured with a device management bootstrapping service address as performed by the M2M device 300 will now be disclosed.

The M2M device 300 sends a request for an Internet Protocol address to the gateway 200.

The M2M device 300 receives a response from the gateway 200. The response comprises the Internet Protocol address as assigned to the M2M device 300 and an LWM2M_BOOTSTRAPPING_URI that represents the device management bootstrapping service address.

As disclosed above, according to an embodiment the M2M device 300 receives a representation of an LWM2M_SERVER_CERT from the gateway 200. If the certificate is larger than 255 bytes it could be fragmented and adjusted in a minimum possible number of LWM2M_SERVER_CERT options. Thus, according to an embodiment the LWM2M_SERVER_CERT is received as fragments, where the fragments are received in at least two messages from the gateway 200.

Each LWM2M_SERVER_CERT option in the scope of DHCP packet could tagged with sequence number so that the M2M device 300 could reassemble the certificate. Hence, according to an embodiment each fragment is tagged with a sequence number and the M2M device 300 is configured to reassemble the LWM2M_SERVER_CERT using the fragments according to the sequence number of each fragment.

In embodiments where the representation is a cryptographic hash of the LWM2M_SERVER_CERT the M2M device 300 could check if the fingerprint of the full certificate matches the fingerprint given by the DHCP server 400. Particularly, according to an embodiment the M2M device 300 is configured to receive a complete LWM2M_SERVER_CERT from a node and check whether the cryptographic hash matches a cryptographic hash of said complete LWM2M_SERVER_CERT.

An embodiment of a method for configuring a device management bootstrapping service address in an M2M device 300 as performed by the DHCP server 400 will now be disclosed.

The DHCP server 400 receives a request for an Internet Protocol address.

The DHCP server 400 sends a response to the gateway 200. The response comprises the Internet Protocol address as assigned to the gateway 200.

The DHCP server 400 sends to the gateway 200 an LWM2M_BOOTSTRAPPING_URI that represents the device management bootstrapping service address.

Figure 11:
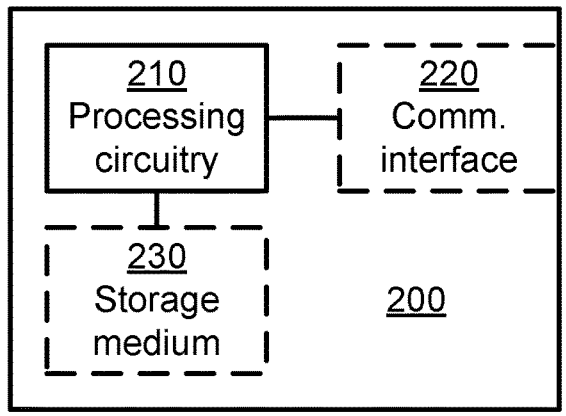
FIG. 11 is a schematic diagram showing functional units of a gateway according to an embodiment.

FIG. 11 schematically illustrates, in terms of a number of functional units, the components of a gateway 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1710a (as in FIG. 17), e.g. in the form of a storage medium 230. The processing circuitry 210 may further be provided as at least one application specific integrated circuit (ASIC), or field programmable gate array (FPGA).

Particularly, the processing circuitry 210 is configured to cause the gateway 200 to perform a set of operations, or steps, S102-S110, as disclosed above. For example, the storage medium 230 may store the set of operations, and the processing circuitry 210 may be configured to retrieve the set of operations from the storage medium 230 to cause the gateway 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The gateway 200 may further comprise a communications interface 220 for communications with other entities, nodes, and devices of the communications network 100. As such the communications interface 220 may comprise one or more transmitters and receivers, comprising analogue and digital components.

The processing circuitry 210 controls the general operation of the gateway 200 e.g. by sending data and control signals to the communications interface 220 and the storage medium 230, by receiving data and reports from the communications interface 220, and by retrieving data and instructions from the storage medium 230. Other components, as well as the related functionality, of the gateway 200 are omitted in order not to obscure the concepts presented herein.

Figure 12:
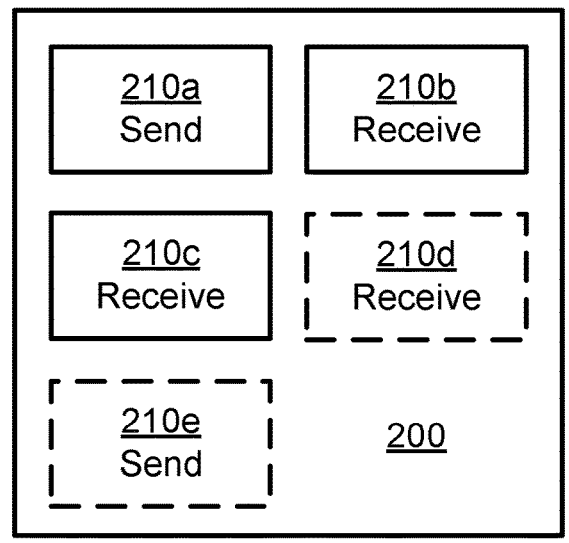
FIG. 12 is a schematic diagram showing functional modules of a gateway according to an embodiment.

FIG. 12 schematically illustrates, in terms of a number of functional modules, the components of a gateway 200 according to an embodiment. The gateway 200 of FIG. 12 comprises a number of functional modules; a first send module 210a configured to perform step S102, a first receive module 210b configured to perform step S104, and a second receive module 210C configured to perform step S106. The gateway 200 of FIG. 12 may further comprise a number of optional functional modules, such as any of a third receive module 210d configured to perform step S108, and a second send module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and the storage medium 230. The processing circuitry 210 may thus be arranged to from the storage medium 230 fetch instructions as provided by a functional module 210a-210e and to execute these instructions, thereby performing any steps of the gateway 200 as disclosed herein.

The gateway 200 may be provided as a standalone device or as a part of at least one further device. For example, the gateway 200 may be provided in a node of the local network 110. Alternatively, functionality of the gateway 200 may be distributed between at least two devices, or nodes. These at least two nodes, or devices, may either be part of the same network part (such as the local network 110) or may be spread between at least two such network parts.

Thus, a first portion of the instructions performed by the gateway 200 may be executed in a first device, and a second portion of the of the instructions performed by the gateway 200 may be executed in a second device; the herein disclosed embodiments are not limited to any particular number of devices on which the instructions performed by the gateway 200 may be executed. Hence, the methods according to the herein disclosed embodiments are suitable to be performed by a gateway 200 residing in a cloud computational environment. Therefore, although a single processing circuitry 210 is illustrated in FIG. 11 the processing circuitry 210 may be distributed among a plurality of devices, or nodes. The same applies to the functional modules 210a-210e of FIG. 12 and the computer program 1720a of FIG. 17 (see below).

Figure 13:
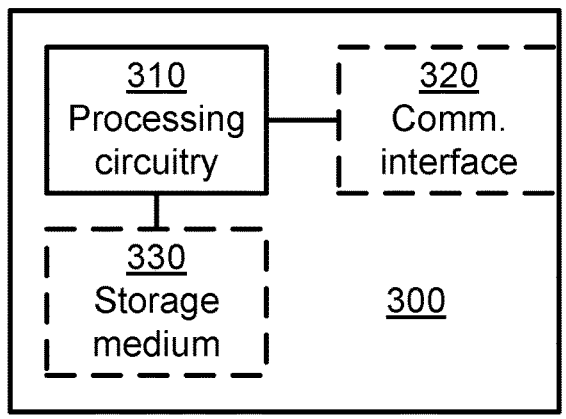
FIG. 13 is a schematic diagram showing functional units of an M2M device according to an embodiment.

FIG. 13 schematically illustrates, in terms of a number of functional units, the components of an M2M device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1710b (as in FIG. 17), e.g. in the form of a storage medium 330. The processing circuitry 310 may further be provided as at least one application specific integrated circuit (ASIC), or field programmable gate array (FPGA).

Particularly, the processing circuitry 310 is configured to cause the M2M device 300 to perform a set of operations, or steps, S202-S206, as disclosed above. For example, the storage medium 330 may store the set of operations, and the processing circuitry 310 may be configured to retrieve the set of operations from the storage medium 330 to cause the M2M device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The M2M device 300 may further comprise a communications interface 320 for communications with other entities, nodes, and devices of the communications network 100. As such the communications interface 320 may comprise one or more transmitters and receivers, comprising analogue and digital components.

The processing circuitry 310 controls the general operation of the M2M device 300 e.g. by sending data and control signals to the communications interface 320 and the storage medium 330, by receiving data and reports from the communications interface 320, and by retrieving data and instructions from the storage medium 330. Other components, as well as the related functionality, of the M2M device 300 are omitted in order not to obscure the concepts presented herein.

Figure 14:
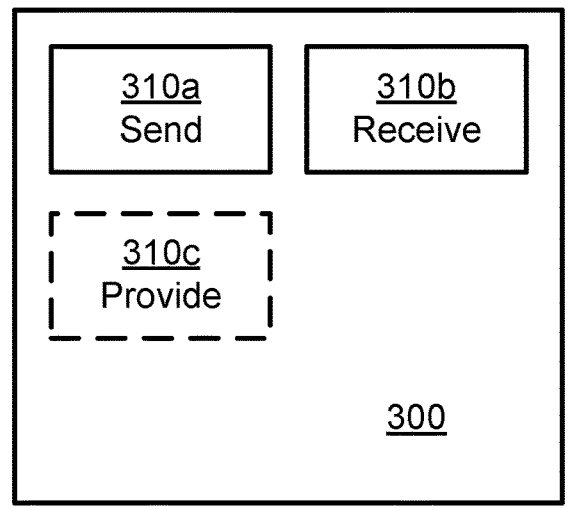
FIG. 14 is a schematic diagram showing functional modules of an M2M device according to an embodiment.

FIG. 14 schematically illustrates, in terms of a number of functional modules, the components of an M2M device 300 according to an embodiment. The M2M device 300 of FIG.

14 comprises a number of functional modules; a send module 310a configured to perform step S202, and a receive module 310b configured to perform step S204. The M2M device 300 of FIG. 14 may further comprise a number of optional functional modules, such as a provide module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and the storage medium 330. The processing circuitry 310 may thus be arranged to from the storage medium 330 fetch instructions as provided by a functional module 310a-310c and to execute these instructions, thereby performing any steps of the M2M device 300 as disclosed herein.

Figure 15:
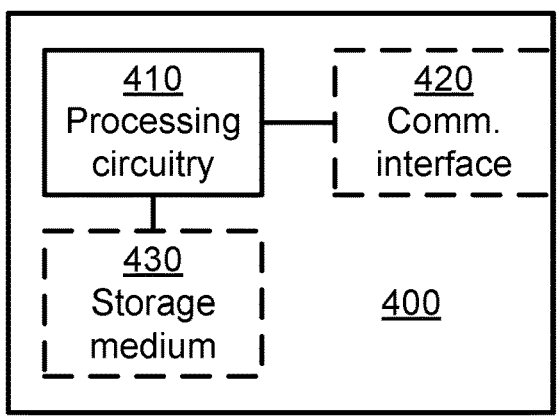
FIG. 15 is a schematic diagram showing functional units of a DHCP server according to an embodiment.

FIG. 15 schematically illustrates, in terms of a number of functional units, the components of a DHCP server 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1710c (as in FIG. 17), e.g. in the form of a storage medium 430. The processing circuitry 410 may further be provided as at least one application specific integrated circuit (ASIC), or field programmable gate array (FPGA).

Particularly, the processing circuitry 410 is configured to cause the DHCP server 400 to perform a set of operations, or steps, S302-S308, as disclosed above. For example, the storage medium 430 may store the set of operations, and the processing circuitry 410 may be configured to retrieve the set of operations from the storage medium 430 to cause the DHCP server 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The DHCP server 400 may further comprise a communications interface 420 for communications with other entities, nodes, and devices of the communications network 100. As such the communications interface 420 may comprise one or more transmitters and receivers, comprising analogue and digital components.

The processing circuitry 410 controls the general operation of the DHCP server 400 e.g. by sending data and control signals to the communications interface 420 and the storage medium 430, by receiving data and reports from the communications interface 420, and by retrieving data and instructions from the storage medium 430. Other components, as well as the related functionality, of the DHCP server 400 are omitted in order not to obscure the concepts presented herein.

Figure 16:
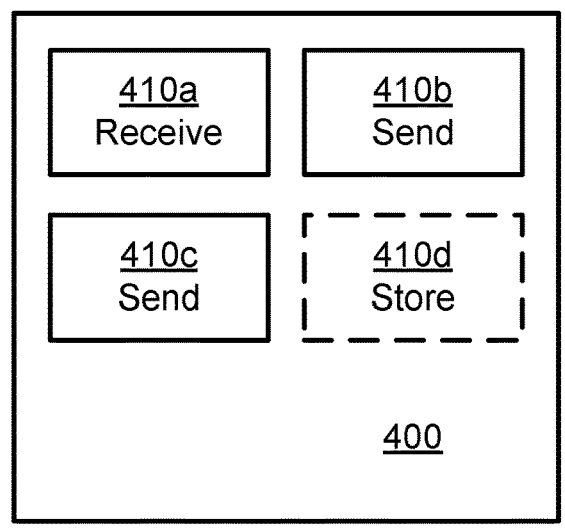
FIG. 16 is a schematic diagram showing functional modules of a DHCP server according to an embodiment.

FIG. 16 schematically illustrates, in terms of a number of functional modules, the components of a DHCP server 400 according to an embodiment. The DHCP server 400 of FIG. 16 comprises a number of functional modules; a receive module 410a configured to perform step S302, a first send module 410b configured to perform step S304, and a second send module 410c configured to perform step S306. The DHCP server 400 of FIG. 16 may further comprise a number of optional functional modules, such as a store module 410d configured to perform step S308. In general terms, each functional module 410a-410d may be implemented in hardware or in software. Preferably, one or more or all functional modules 410a-410d may be implemented by the processing circuitry 410, possibly in cooperation with the communications interface 420 and the storage medium 430. The processing circuitry 410 may thus be arranged to from the storage medium 430 fetch instructions as provided by a functional module 410a-410d and to execute these instructions, thereby performing any steps of the DHCP server 400 as disclosed herein.

The DHCP server 400 may be provided as a standalone device or as a part of at least one further device. Alternatively, functionality of the gateway 200 may be distributed between at least two devices, or nodes. These at least two nodes, or devices, may either be part of the same network part or may be spread between at least two such network parts.

Thus, a first portion of the instructions performed by the DHCP server 400 may be executed in a first device, and a second portion of the of the instructions performed by the DHCP server 400 may be executed in a second device; the herein disclosed embodiments are not limited to any particular number of devices on which the instructions performed by the DHCP server 400 may be executed. Hence, the methods according to the herein disclosed embodiments are suitable to be performed by a DHCP server 400 residing in a cloud computational environment. Therefore, although a single processing circuitry 410 is illustrated in FIG. 15 the processing circuitry 410 may be distributed among a plurality of devices, or nodes. The same applies to the functional modules 410a-410d of FIG. 16 and the computer program 1720c of FIG. 17 (see below).

Figure 17:
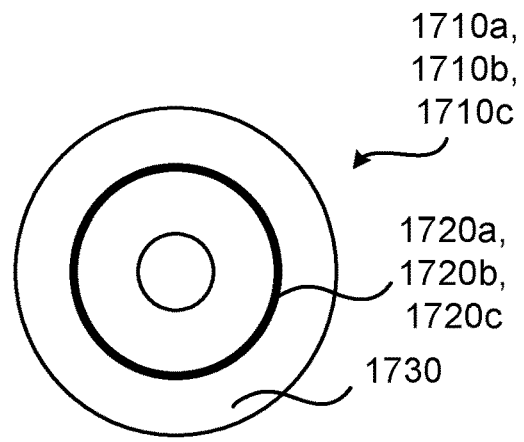
FIG. 17 shows one example of a computer program product comprising computer readable means according to an embodiment.

FIG. 17 shows one example of a computer program product 1710a, 1710b, 1710c comprising computer readable means 1730. On this computer readable means 1730, a computer program 1720a can be stored, which computer program 1720a can cause the processing circuitry 210 and thereto operatively coupled entities and devices, such as the communications interface 220 and the storage medium 230, to execute methods according to embodiments described herein. The computer program 1720a and/or computer program product 1710a may thus provide means for performing any steps of the gateway 200 as herein disclosed. On this computer readable means 1730, a computer program 1720b can be stored, which computer program 1720b can cause the processing circuitry 310 and thereto operatively coupled entities and devices, such as the communications interface 320 and the storage medium 330, to execute methods according to embodiments described herein. The computer program 1720b and/or computer program product 1710b may thus provide means for performing any steps of the M2M device 300 as herein disclosed. On this computer readable means 1730, a computer program 1720c can be stored, which computer program 1720c can cause the processing circuitry 410 and thereto operatively coupled entities and devices, such as the communications interface 420 and the storage medium 430, to execute methods according to embodiments described herein. The computer program 1720c and/or computer program product 1710c may thus provide means for performing any steps of the DHCP server 400 as herein disclosed.

In the example of FIG. 17, the computer program product 1710a, 1710b, 1710c is illustrated as an optical disc, such as a CD (compact disc) or a DVD (digital versatile disc) or a Blu-Ray disc. The computer program product 1710a, 1710b, 1710c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1720a, 1720b, 1720c is here schematically shown as a track on the depicted optical disk, the computer program 1720a, 1720b, 1720c can be stored in any way which is suitable for the computer program product 1710a, 1710b, 1710c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a message brokering service address in a machine-to-machine, M2M, device, the method being performed by a gateway, the method comprising:
   sending a request to a dynamic host configuration protocol, DHCP, server for configuration;
   receiving a response from the DHCP server comprising at least address information assigned to the gateway; and
   receiving a Message Queue Telemetry Transport protocol Broker Uniform Resource Identifier, MQTT_BROKER_URI, representing the message brokering service address from a node.

2. A gateway for configuring a message brokering service address in a machine-to-machine, M2M, device, the gateway comprising:
   processing circuitry; and
   a storage medium storing instructions that, when executed by the processing circuitry, cause the gateway to,
      send a request to a dynamic host configuration protocol, DHCP, server for configuration,
      receive a response from the DHCP server comprising at least address information assigned to the gateway, and
      receive a Message Queue Telemetry Transport protocol Broker Uniform Resource Identifier, MQTT_BROKER_URI, representing the message brokering service address from a node.

3. The gateway according to claim 2, wherein the storage medium stores instructions that, when executed by the processing circuitry, further cause the gateway to,
   receive a request for an Internet Protocol address from the M2M device, and
   send a response to the M2M device, the response comprising the Internet Protocol address as assigned to the M2M device and the MQTT_BROKER_URI.

4. The gateway according to claim 2, wherein the node is the DHCP server.

5. The gateway according to claim 2, wherein the DHCP server is an Internet Protocol version six DHCP, DHCPv6, server.

6. The gateway according to claim 5, wherein the MQTT_BROKER_URI is received in a DHCPv6 advertise message.

7. The gateway according to claim 6, wherein reception of the DHCPv6 advertise message is preceded by transmission of a DHCPv6 solicit message from the gateway to the DHCPv6 server, the DHCPv6 solicit message comprising the request for IA_PD.

8. The gateway according to claim 2, wherein the address information is at least a prefix of an Internet Protocol address version six, IPv6, address.

9. The gateway according to claim 2, wherein the DHCP server is an Internet Protocol version four DHCP, DHCPv4, server.

10. The gateway according to claim 2, wherein the response comprises a complete Internet Protocol address assigned to the gateway.

11. The gateway according to claim 2, wherein the address information is an Internet Protocol address version four, IPv4, address.

12. The gateway according to claim 2, wherein the MQTT_BROKER_URI is received in a DHCP offer message.

13. The gateway according to claim 12, wherein reception of the DHCP offer message is preceded by transmission of a DHCP discover message from the gateway to the DHCP server.

14. A machine-to-machine, M2M, device for the M2M device to be configured with a message brokering service address, M2M device comprising:
   processing circuitry; and
   a storage medium storing instructions that, when executed by the processing circuitry, cause the machine-to-machine, M2M, device to,
      send a request for an Internet Protocol address to a gateway, and
         receive a response from the gateway, the response comprising the Internet Protocol address as assigned to the M2M device and a Message Queue Telemetry Transport protocol Broker Uniform Resource Identifier, MQTT_BROKER_URI, representing the message brokering service address.

15. The M2M device according to claim 14, wherein the storage medium stores instructions that, when executed by the processing circuitry, cause the M2M device to,
   provide the Internet Protocol address to an MQTT broker node when registering with the MQTT broker node.

16. The M2M device according to claim 15, wherein said registering is unsuccessful when the Internet Protocol address does not belong to a list of Internet Protocol addresses served by a Dynamic Host Configuration Protocol, DHCP, server.

17. A Dynamic Host Configuration Protocol, DHCP, server for configuring a message brokering service address in a machine-to-machine, M2M, device, the Dynamic Host Configuration Protocol, DHCP, server comprising:
   processing circuitry; and
   a storage medium storing instructions that, when executed by the processing circuitry, cause the Dynamic Host Configuration Protocol, DHCP, server to,
      receive a request for configuration,
      send a response to the gateway comprising at least address information assigned to the gateway, and
      send, to the gateway, a Message Queue Telemetry Transport protocol Broker Uniform Resource Identifier, MQTT_BROKER_URI, representing the message brokering service address.

18. The DHCP server according to claim 17, wherein the storage medium stores instructions that, when executed by the processing circuitry, cause the DHCP server to,
   store at least said address information in a list of Internet Protocol addresses served by the DHCP server.

* * * * *